(12) United States Patent
Friedsmann et al.

(10) Patent No.: US 7,703,807 B2
(45) Date of Patent: Apr. 27, 2010

(54) SEAT BELT RETRACTOR

(75) Inventors: Udo Friedsmann, Dornstadt (DE);
Hermann Hasse, Lonsee (DE); Jochen Benz, Ulm (DE); Jochen Lang, Ulm (DE); Sebastian Götze, Zschopau (DE); Hans-Jürgen Divo, Langenau (DE); Gerhard Klingauf, Balzheim (DE); Carsten Felber, Jettingen (DE); Robert Fleischmann, Neu-Ulm/Pfuhl (DE); Paul Sprongl, Ulm (DE); Wolfgang Schrade, Blaustein/Wippingen (DE); Christoph Pechhold, Erbach (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/320,791

(22) Filed: Feb. 4, 2009

(65) Prior Publication Data
US 2009/0218803 A1  Sep. 3, 2009

(30) Foreign Application Priority Data
Feb. 5, 2008  (DE) ................. 10 2008 008 041

(51) Int. Cl.
*B60R 22/36* (2006.01)
(52) U.S. Cl. ..................................... 280/806
(58) Field of Classification Search ........... 280/806, 280/807; 297/474–475, 480; 60/407, 632, 60/638
See application file for complete search history.

(56) References Cited

U.S. PATENT DOCUMENTS

| 5,881,962 | A   | * | 3/1999  | Schmidt et al. ........... 242/374 |
| 6,405,959 | B1  |   | 6/2002  | Klingauf et al. |
| 6,446,897 | B1  | * | 9/2002  | Arima et al. ............. 242/374 |
| 2003/0029953 | A1 |  | 2/2003  | Matsumura |
| 2007/0272786 | A1 |  | 11/2007 | Schmidt et al. |

FOREIGN PATENT DOCUMENTS

| DE | 42 27 781 A1 | 2/1994 |
| DE | 199 07 962 A1 | 8/2000 |
| DE | 100 10 379 A1 | 9/2000 |
| DE | 103 56 206 A1 | 7/2005 |
| EP | 1 283 137 A2 | 2/2003 |
| JP | 63212151 A * | 9/1988 |

* cited by examiner

*Primary Examiner*—Faye M. Fleming
(74) *Attorney, Agent, or Firm*—Foley & Lardner LLP

(57) ABSTRACT

A seat belt retractor for a safety belt including a seat belt spindle for winding up and unwinding the safety belt and a tensioning drive. The seat belt spindle includes a gas generator, a drive wheel and a supply pipe which connects the gas generator and the drive wheel. A plurality of thrust members are present in the supply pipe which, after triggering the gas generator, are accelerated and indirectly or directly drive the drive wheel for winding up the safety belt. An inertia coupling is arranged between the drive wheel and the seat belt spindle. The inertia coupling comprises coupling elements which, during an acceleration of the drive wheel, pivot outward and are directly or indirectly coupled to the seat belt spindle.

12 Claims, 16 Drawing Sheets

SEAT BELT RETRACTOR

BACKGROUND

The application relates to a seat belt retractor for a safety belt comprising a seat belt spindle for winding up and unwinding the safety belt and comprising a tensioning drive.

Such a seat belt retractor comprising a tensioning drive is known from the European patent application EP 1 283 137 (incorporated by reference herein). The tensioning drive comprises a gas generator, a drive wheel and a connecting device which connects the gas generator and the drive wheel. The connecting device comprises a supply pipe and a plurality of thrust members located in the supply pipe, which are accelerated after triggering the gas generator and drive the drive wheel for winding up the safety belt.

The embodiments of a seat belt retractor disclosed herein provide improved tensioning behavior of the retractor.

SUMMARY

One disclosed embodiment relates to a seat belt retractor for a safety belt comprising a seat belt spindle for winding up and unwinding the safety belt and a tensioning drive. The seat belt spindle comprises a gas generator, a drive wheel and a supply pipe which connects the gas generator and the drive wheel. A plurality of thrust members are present in the supply pipe which, after triggering the gas generator, are accelerated and indirectly or directly drive the drive wheel for winding up the safety belt. An inertia coupling is arranged between the drive wheel and the seat belt spindle. The inertia coupling comprises coupling elements which, during an acceleration of the drive wheel, pivot outward and are directly or indirectly coupled to the seat belt spindle.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
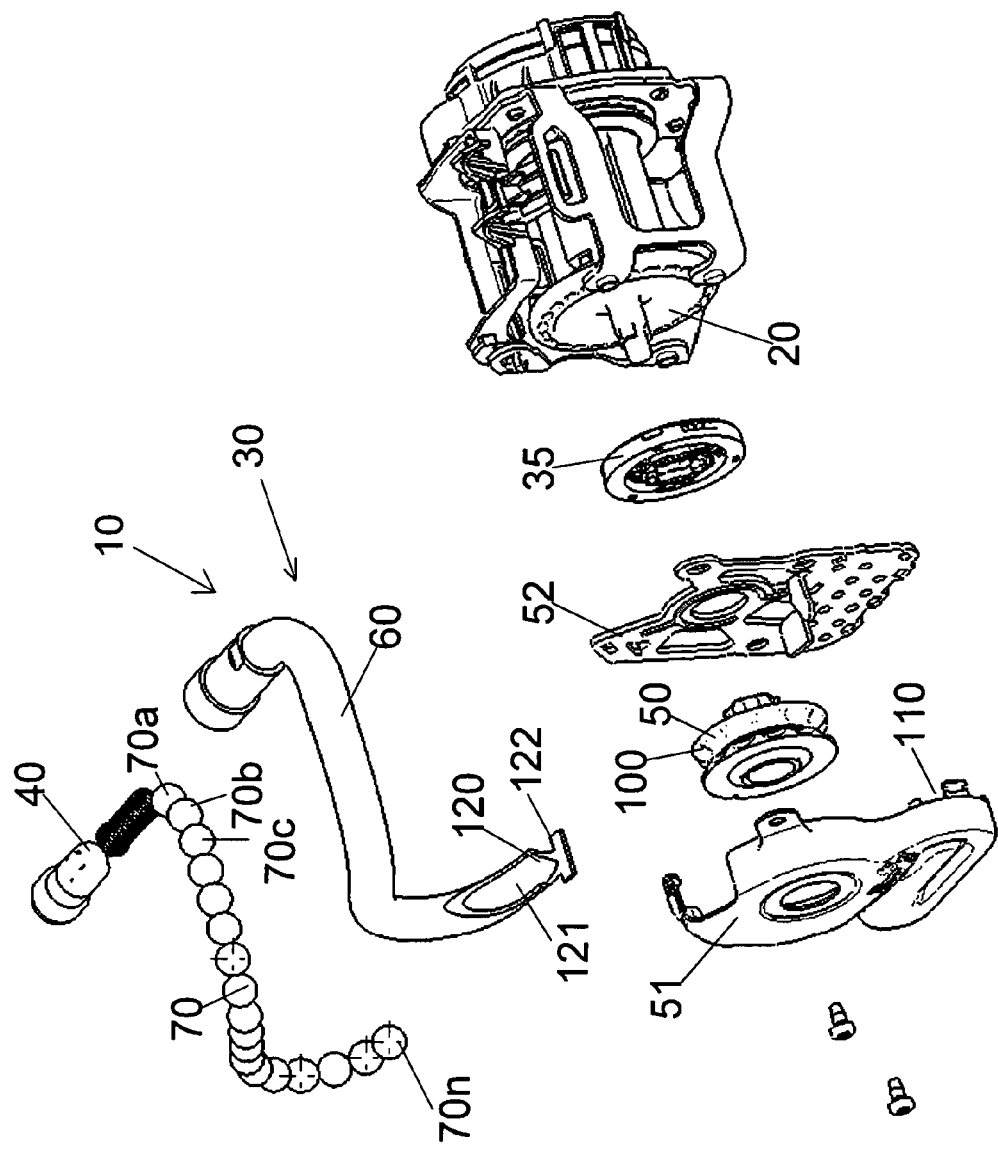
FIG. 1 is an exploded view of a seat belt retractor according to an exemplary embodiment.

Seat belts (e.g., safety belts) are known to be provided in vehicles to restrain occupants of the vehicle in seats (i.e., during a collision or rollover event). The seat belt apparatus may be, for example, a conventionally known three-point seat belt apparatus. The seat belt apparatus a seat belt retractor which is arranged adjacent to the vehicle seat and a seat belt which is wound by the seat belt retractor. The seat belt may be withdrawn from the seat belt retractor and fixed to a vehicle floor or the vehicle seat with a belt anchor. The operation of taking on and off the seat belt in the seat belt apparatus is the same as a conventional seat belt apparatus.

According to one exemplary embodiment, a seat belt retractor for a safety belt comprising a seat belt spindle for winding up and unwinding the safety belt and a tensioning drive. The seat belt spindle comprises a gas generator, a drive wheel and a supply pipe which connects the gas generator and the drive wheel. A plurality of thrust members are present in the supply pipe which, after triggering the gas generator, are accelerated and indirectly or directly drive the drive wheel for winding up the safety belt.

According to an exemplary embodiment, between the drive wheel and the seat belt spindle an inertia coupling is arranged which comprises coupling elements which, during an acceleration of the drive wheel, pivot outward and are directly or indirectly coupled to the seat belt spindle. Because the coupling elements are able to pivot, after the end of the tensioning process it is possible to disengage said coupling elements again, allowing the tensioning drive to be separated from the seat belt spindle. Preferably, contact surfaces of the coupling elements are formed such that they remain engaged in the belt tensioning rotational direction under load, and may be disengaged in the load-free state and/or in the direction of extension of the seat belt. According to various exemplary embodiments, the coupling elements may be formed from, for example, coupling claws, coupling catches, coupling drums or coupling wedges.

Preferably, the seat belt spindle comprises a tubular internal wall into which the contact surfaces of the coupling elements are directly forced when pivoted outward. The tubular wall allows a reduced number of parts to be used, reducing the weight of the seat belt retractor. The contact surfaces of the coupling elements are preferably grooved. According to a particularly preferred embodiment of the seat belt retractor, the grooved contact surfaces of the coupling elements are serrated and have alternate steep and flat edges. Preferably, the steep and flat edges are formed such that the force is transmitted to the seat belt spindle at least substantially through the flat edges.

Preferably, the inertia coupling comprises a coupling disk connected to the drive wheel, which is formed by an inner ring, an outer ring and at least one resilient connecting element, the coupling elements and a guide disk of the inertia coupling being inserted into the coupling disk such that, with an acceleration of the drive wheel by the gas generator, the inner ring and the guide disk are rotated relative to the outer ring due to the resilient action of the resilient connecting element(s), so that stops of the outer ring pivot the coupling elements outward. Preferably, the resilient connecting elements are configured such that, when the tensioning force of the tensioning drive drops, the relative rotation between the inner ring and the outer ring is cancelled, so that the coupling elements are pivoted by further stops of the outer ring back into their initial position before the tensioning process.

In order to ensure the coupling of the seat belt spindle and the coupling elements in any angular position without jerky movements, it is regarded as advantageous if the tubular inner wall is smooth before the initial contact with the coupling elements.

The invention is described in more detail hereinafter with reference to exemplary embodiments; in this connection and by way of example. In the figures, for the sake of clarity, the same reference numerals are always used for identical or comparable components.

In FIG. 1, an exemplary embodiment of a seat belt retractor 10 is seen in a schematic exploded view. The seat belt retractor 10 comprises a seat belt spindle 20, a tensioning drive 30, and an inertia coupling 35 connecting the tensioning drive 30 and the seat belt spindle 20. The spindle 20 turns about a longitudinal axis to wind up a seat belt (not shown). A tensioning drive 30 is provided to turn the spindle 20 and wind up the seat belt in a collision to better retain the occupant of the vehicle in a seat associated with the seat belt apparatus.

Figure 10:
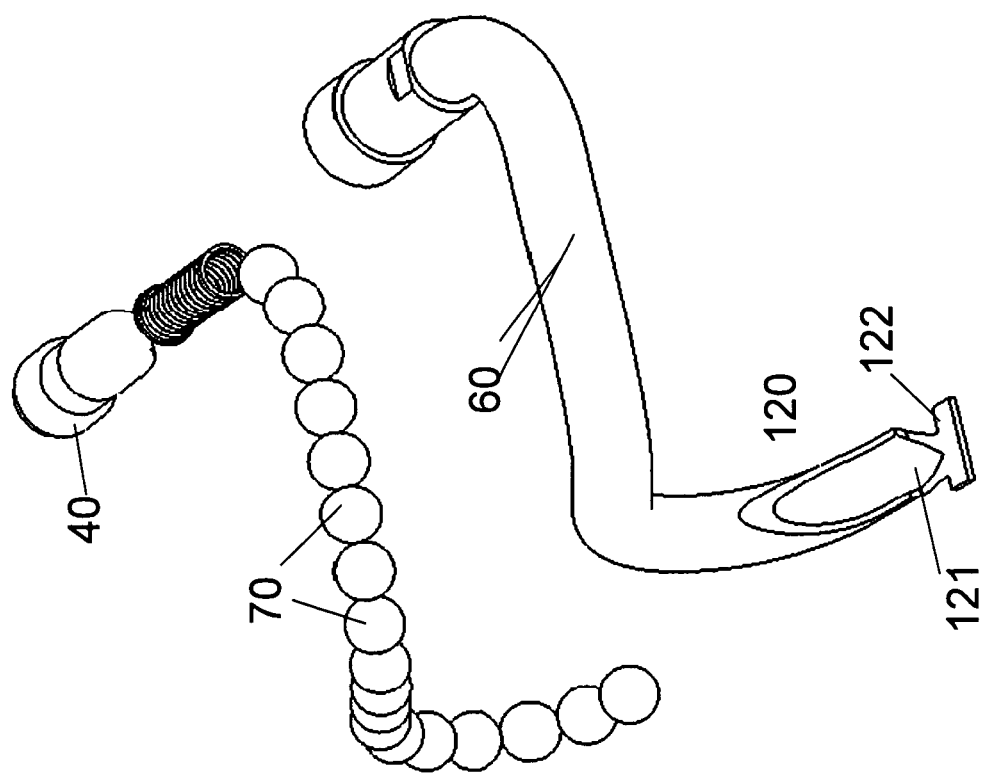
FIG. 10 is an exploded view of a portion of the seat belt retractor of FIG. 1 including a supply pipe, a plurality of thrust elements housed in the supply pipe, and a gas generator for driving the thrust elements according to an exemplary embodiment.
Figure 11:
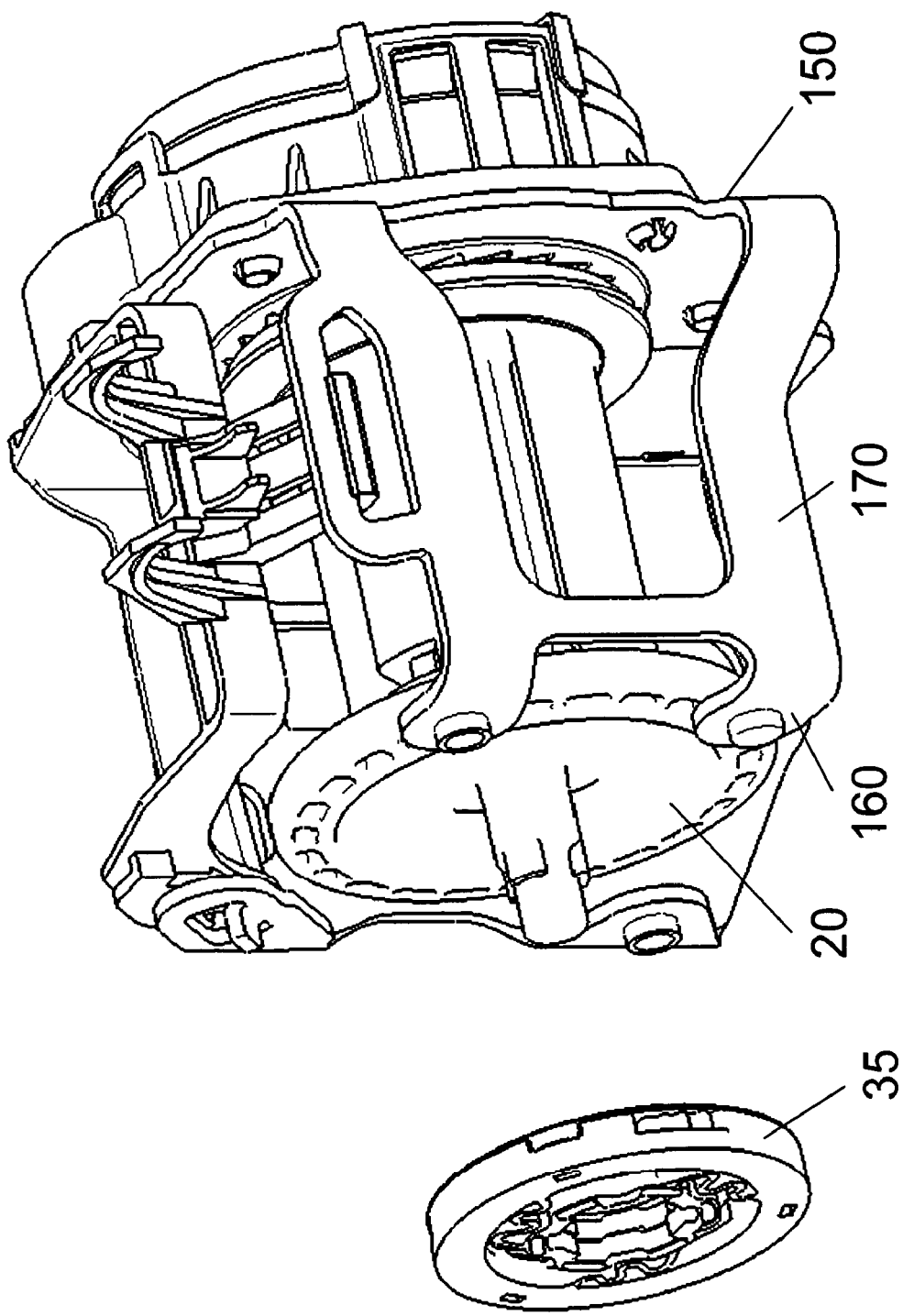
FIG. 11 is an exploded view of a portion of the seat belt retractor of FIG. 1 including a seat belt spindle and an inertia coupling according to an exemplary embodiment.
Figure 12:
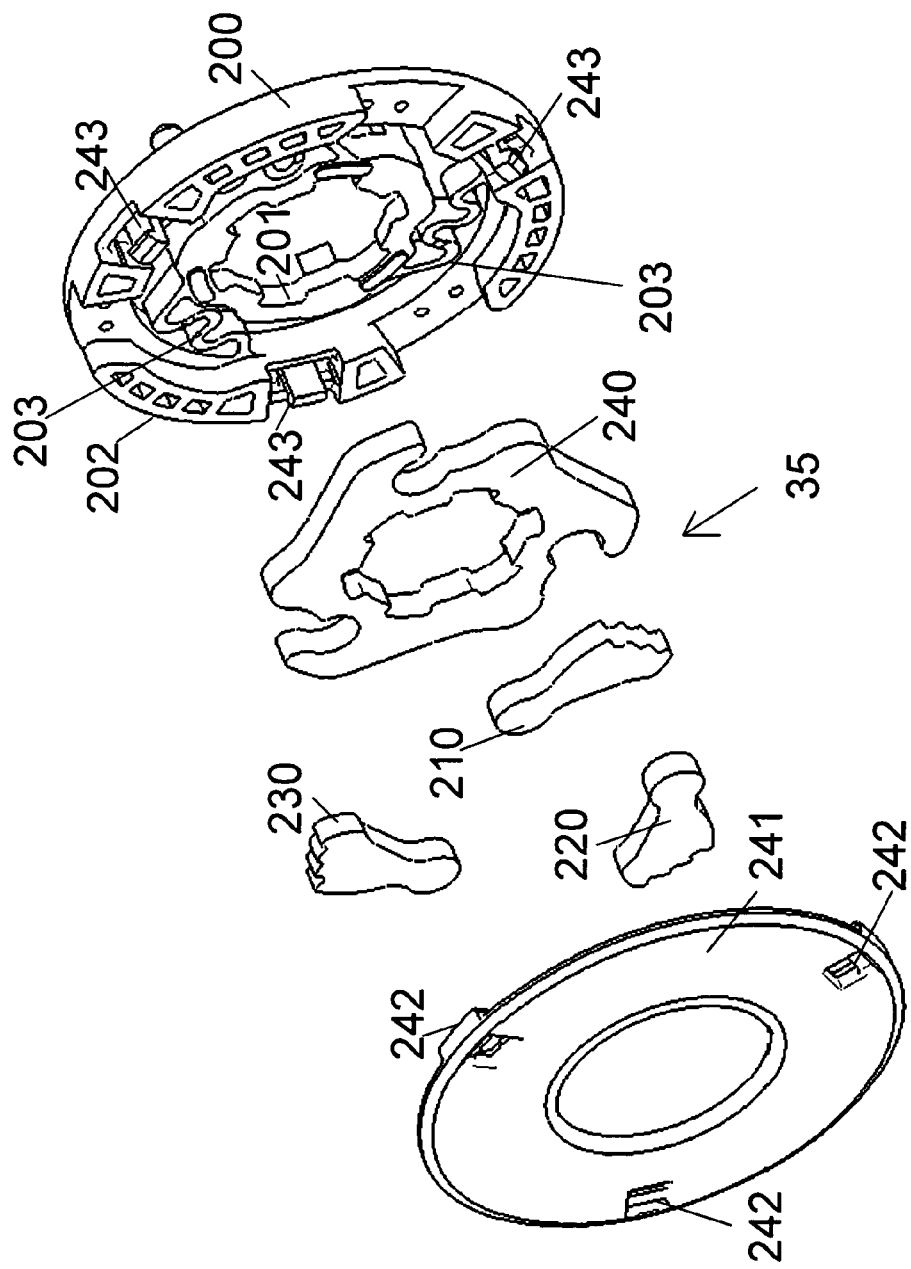
FIG. 12 is an exploded view of the inertia coupling of FIG. 11 according to an exemplary embodiment.

As shown in FIG. 10, the tensioning drive 30 comprises a pyrotechnical gas generator 40, for example in the form of a micro gas generator, a drive wheel 50, a curved supply pipe 60 connecting the gas generator 40 and the drive wheel 50, as well as a plurality of inertia elements and/or thrust elements 70.

According to an exemplary embodiment, the thrust elements 70 are spherical members. Preferably, there are two types of thrust element, namely one or more steel thrust elements (i.e., steel balls), and one or more plastics thrust elements (i.e., plastics balls). The steel thrust elements are preferably all identical to one another and the plastics thrust elements are preferably all identical to one another. The diameter of the plastics thrust elements is preferably slightly greater than the diameter of the steel thrust elements. The plastics thrust elements are provided proximate to the gas generator 40 and are configured to seal the supply pipe 60 so that the drive pressure of the gas generator 40 may efficiently accelerate the steel thrust elements. The steel thrust elements are configured to engage and drive the drive wheel 50.

Figure 9:
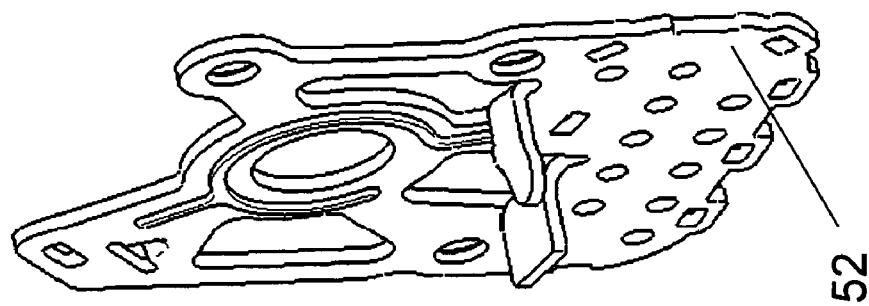
FIG. 9 is an exploded view of a portion of the seat belt retractor of FIG. 1 including a drive wheel, a retaining plate, and a retaining cap according to an exemplary embodiment.
Figure 9:
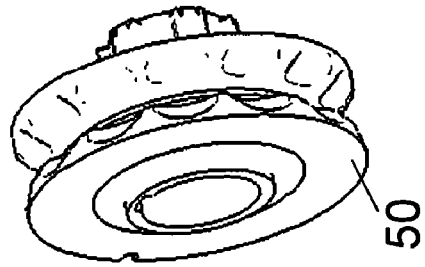
Figure 9:
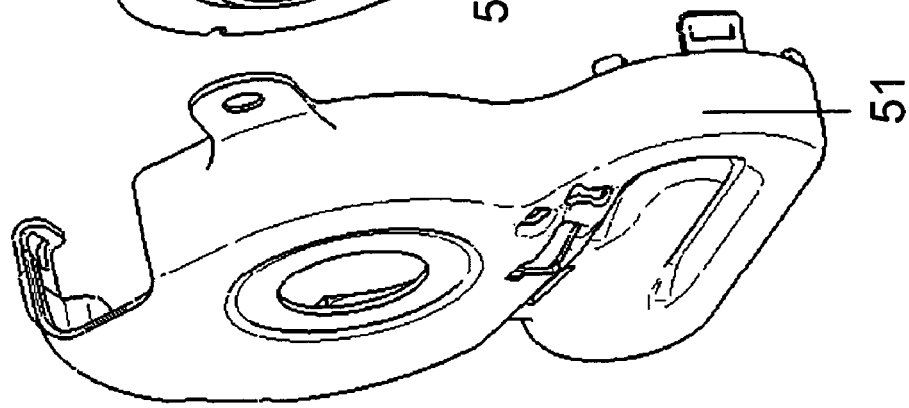

As shown in FIG. 9, the drive wheel 50 is rotatably held between a retaining cap 51 and a retaining plate 52. A plurality of holder shells 100 are distributed about the periphery of the drive wheel 50. The thrust elements 70 engage the holder shells 100 in order to drive the drive wheel 50. To this end, the holder shells 100 are shaped to receive the thrust elements 70 (e.g., generally hemispherical or cup-shaped to receive spherical thrust members). Once engaged in one of the holder shells 100, each of the thrust elements 70 run tangentially past the drive wheel 50 in order to pass subsequently into a receptacle 110 arranged downstream.

Figure 2:
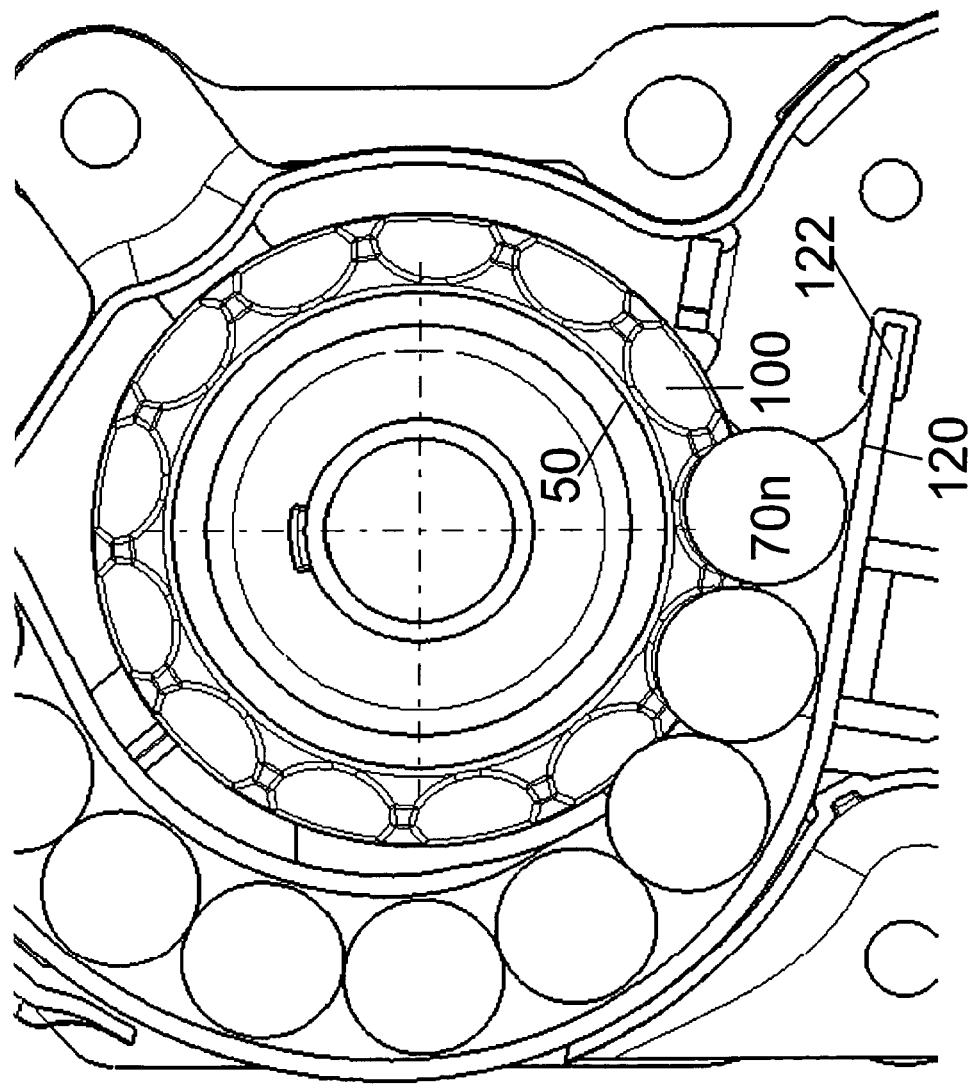
FIGS. 2-4 are end views of the seat belt retractor of FIG. 1 showing the thrust elements engaging the drive wheel.
Figure 3:
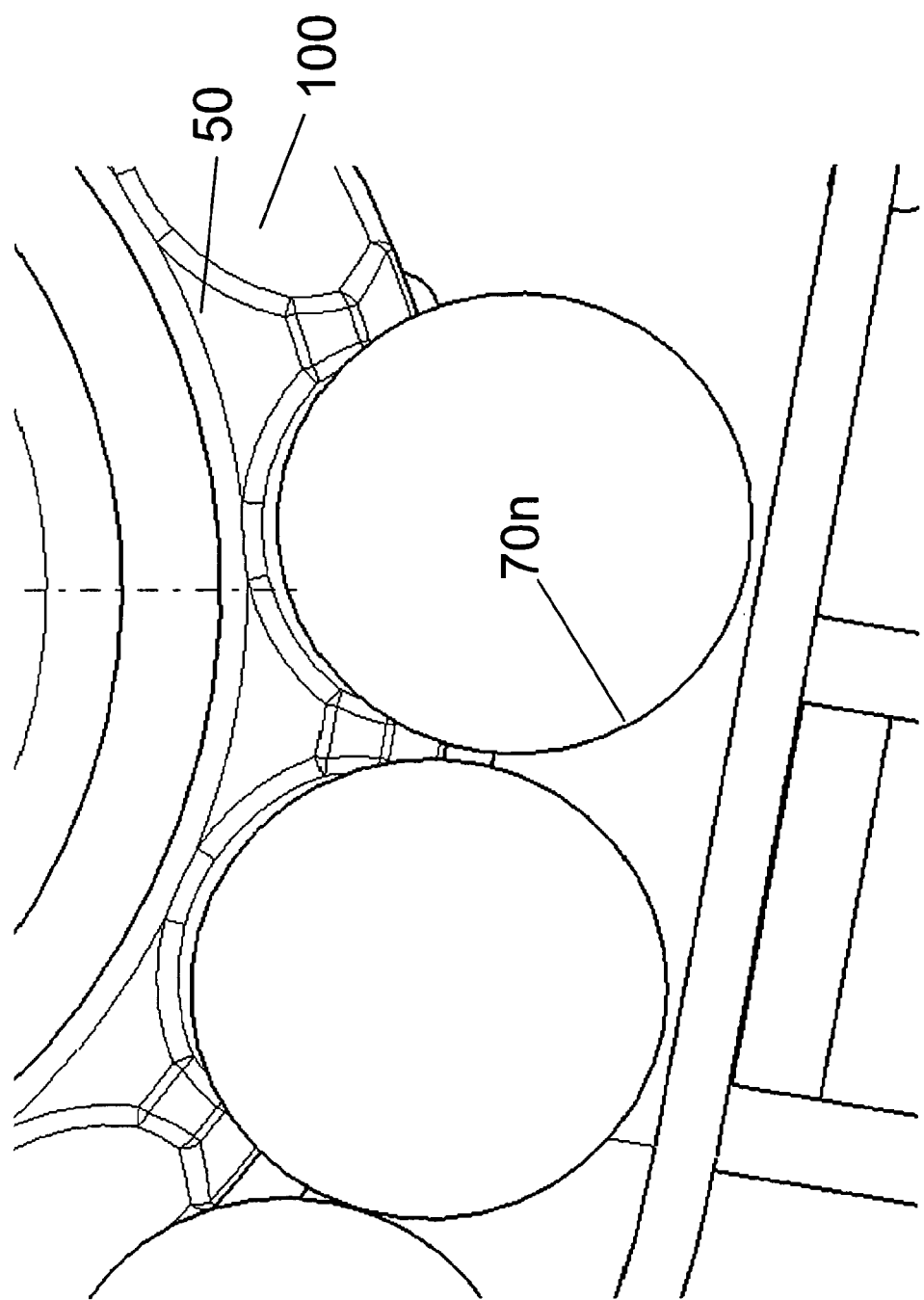

The holder shells 100 of the drive wheel 50 are preferably formed so that the thrust elements 70, when engaged in the drive wheel 50, are always spaced apart from one another and are not in contact with one another; this is, for example, shown in more detail in FIGS. 2 and 3. The force transmission preferably takes place at least partially, therefore, by a positive connection. The number of thrust elements 70 is preferably greater than the number of holder shells 100 of the drive wheel 50, so that the drive wheel 50 is able to rotate completely about its own axis more than once.

Preferably, the supply pipe 60 is sealed solely by plastics thrust elements, namely for example by means of one, two or three plastics balls 70a, 70b and 70c. Preferably the plastic thrust elements 70a, 70b, and 70c are the first thrust elements 70 in the supply pipe 60 (e.g., the closes thrust elements to the gas generator 40. According to other exemplary embodiments, the supply pipe 60 may be otherwise sealed between the gas generator 40 and the steel thrust members. According to still other exemplary embodiments, the supply pipe 60 may not be sealed.

Preferably, the supply pipe 60 in the engagement region 120, in which the thrust elements 70 are engaged in the drive wheel 50, has a resilient tubular wall portion 120. According to an exemplary embodiment, the resilient tubular wall portion 120 may, for example, have a flat end portion 121 with a T-shaped fastening element 122. The resilient tubular wall portion 120 facilitates optimizing the engagement behavior and avoiding jamming of the thrust elements in the drive wheel 50.

Figure 4:
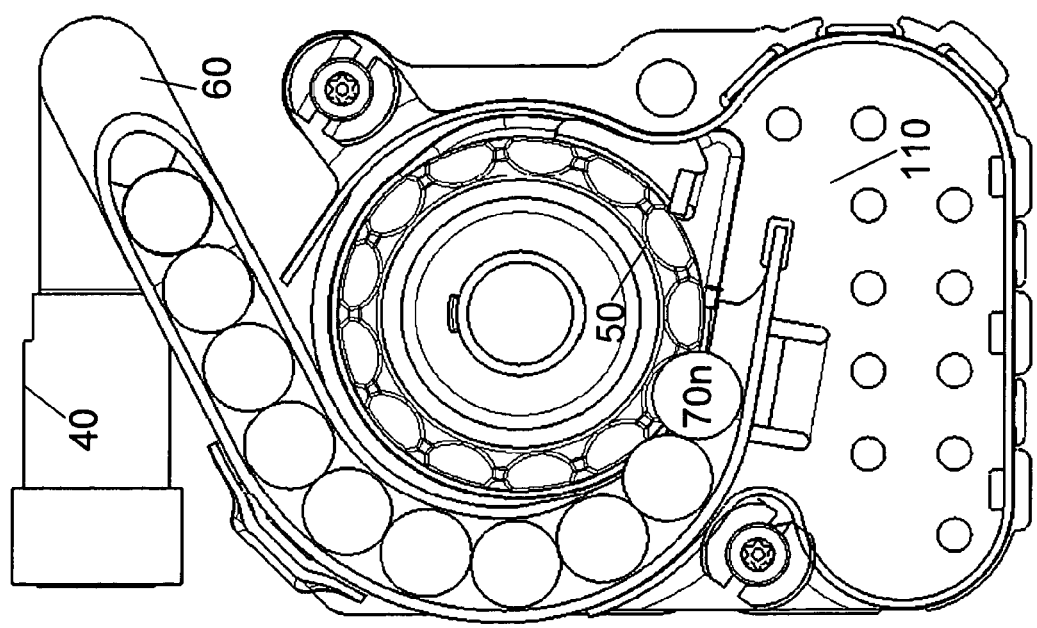

Referring to FIG. 4, a breakable fixing, for example in the form of a shear pin may be provided to prefix the drive wheel 50. The first thrust element (e.g. the thrust element next to the drive wheel) is in turn prefixed in the delivery state of the tensioning drive 30 in a holder shell 100 of the drive wheel 50. The first thrust element is preferably formed from steel and the drive wheel 50 is formed a different material (e.g., a different steel, aluminum, or another suitable metal or alloy).

Figure 5:
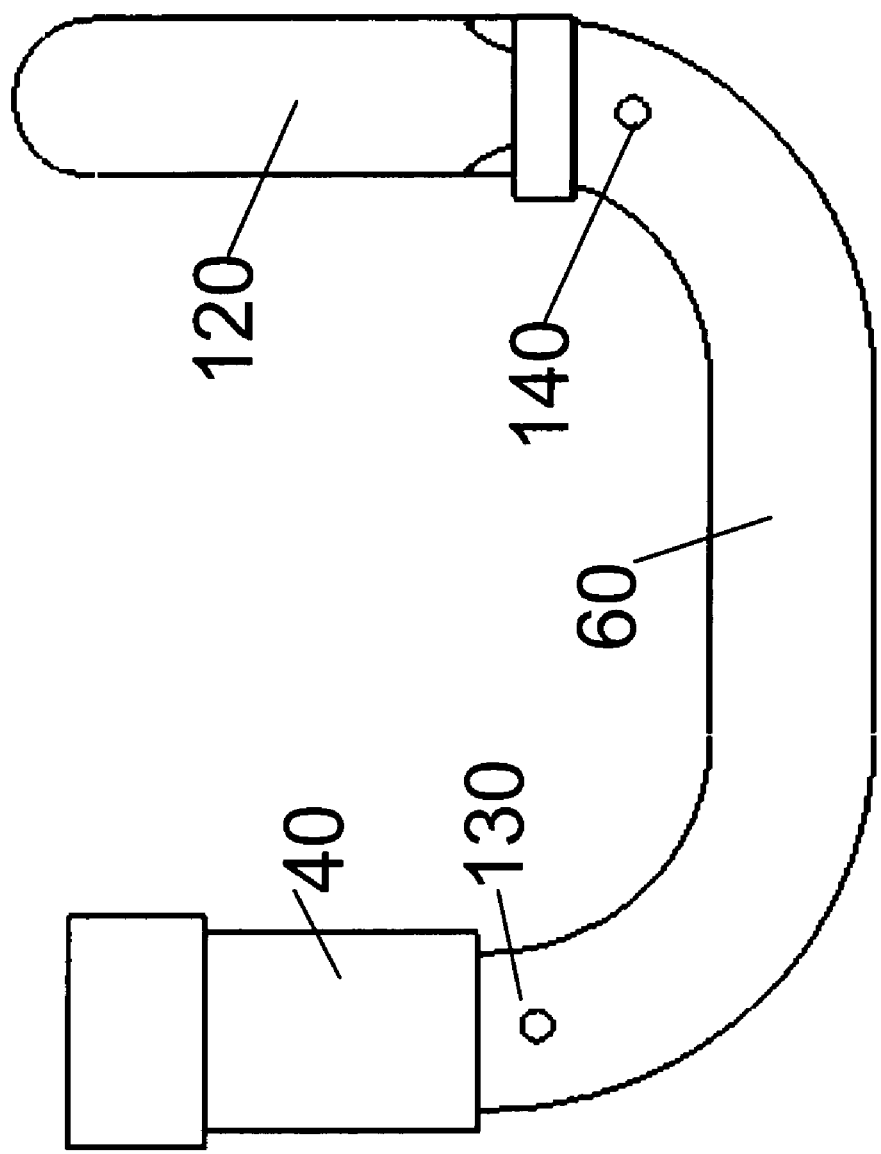
FIG. 5 is top view of a supply pipe for the seat belt retractor of FIG. 1 according to an exemplary embodiment.

As may be seen from FIG. 5, the supply pipe 60 is preferably provided with a control aperture 140 in the central region of the supply pipe 60 between the gas generator 40 and the drive wheel 50. The control aperture 140 may, for example, be formed by an opening in the supply pipe 60. The control aperture 40 reduces the pressure in the supply pipe 60 when the last thrust element (e.g., the thrust element located closest to the gas generator 40) passes the opening 40. The tensioning force of the tensioning drive 30 is reduced as a result of the drop in pressure, so that, for example, the tensioning process may be stopped due to the counteracting seat belt extraction force. The opening is, however, preferably of sufficiently small size for the tensioning process not to be terminated solely by the drop in pressure and for all thrust elements 70 to be fired into the receptacle 110, in spite of the drop in pressure, whilst allowing a sufficiently high seat belt extraction force.

Referring still to FIG. 5, the supply pipe 60 is preferably further provided with a pressure relief aperture 130 in the region of the gas generator 40. The pressure relief aperture 130 preferably prevents excess pressure of the tensioning drive 30.

Figure 6:
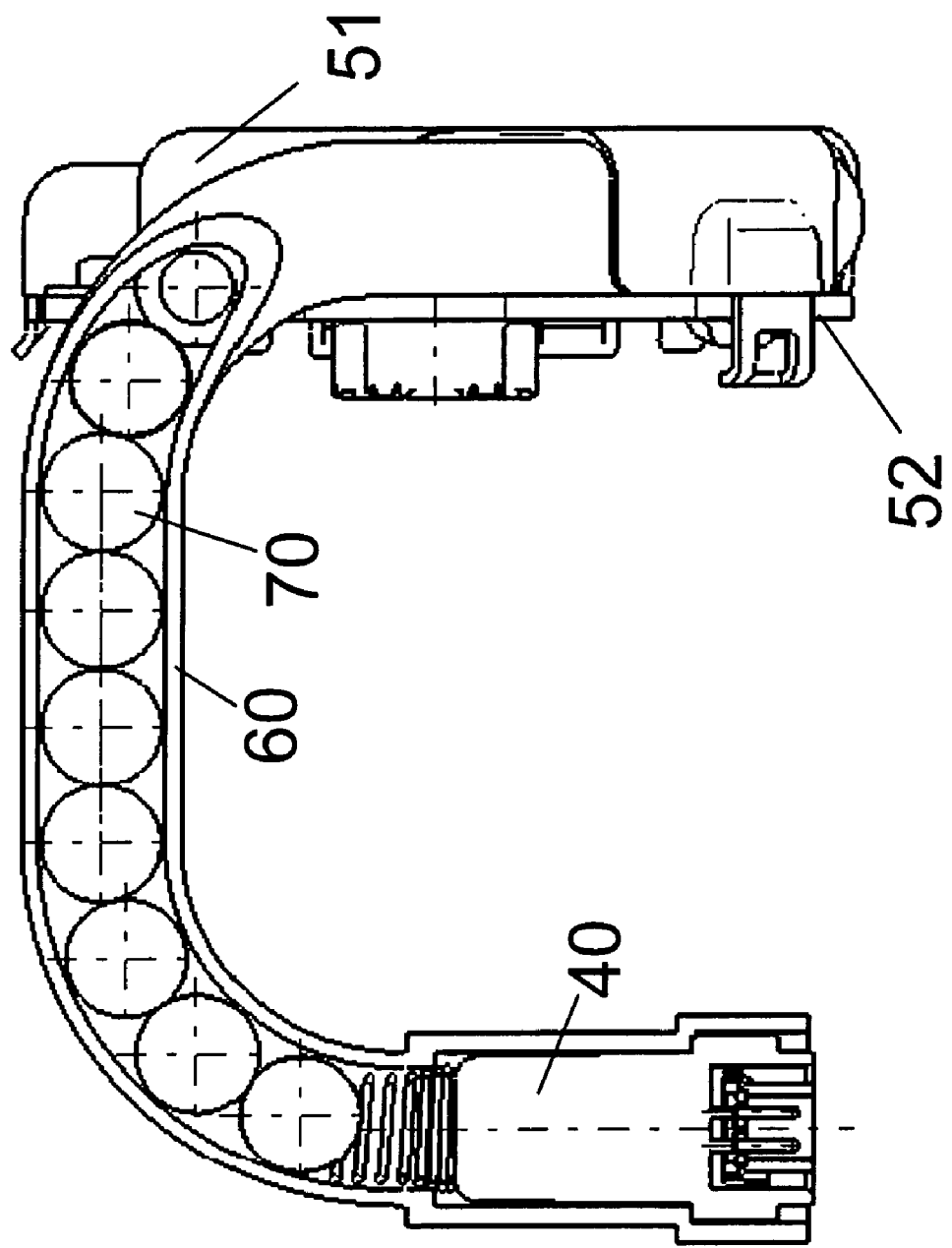
FIG. 6 is a cross-section view of the supply pipe of FIG. 5 according to an exemplary embodiment.
Figure 7:
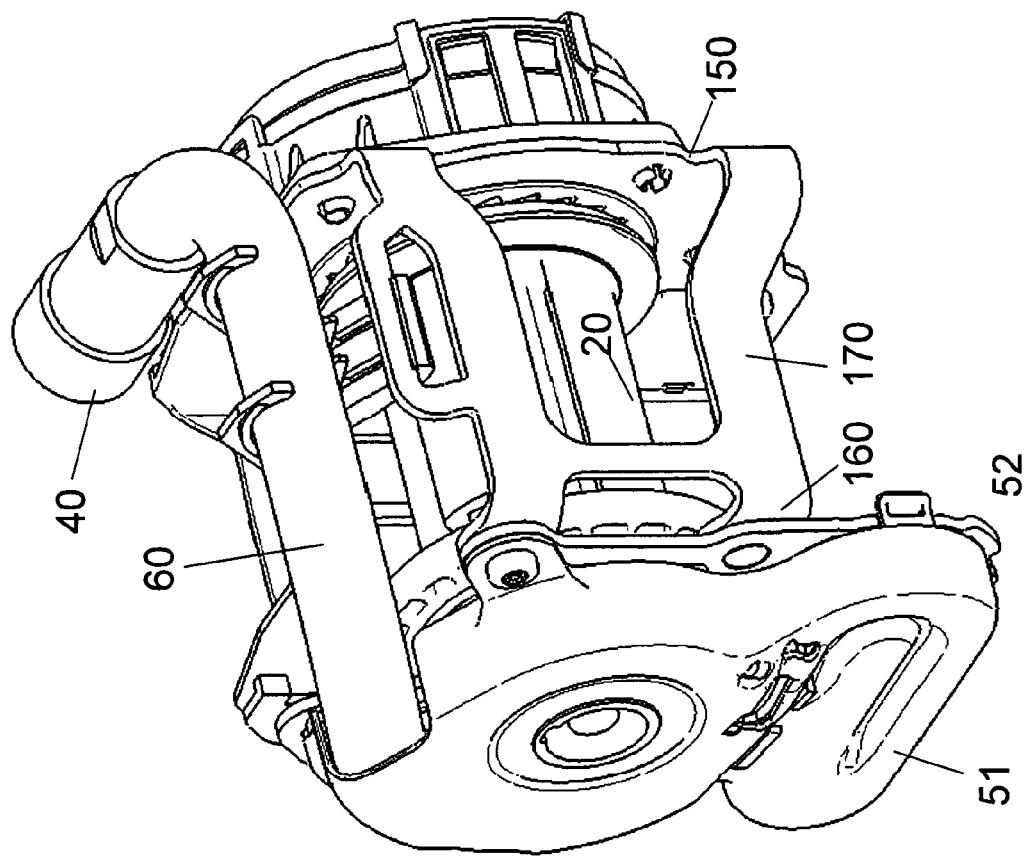
FIG. 7 is an isometric view of the seat belt retractor of FIG. 1.

The tensioning drive 30 is shown again in FIG. 6 from above in a different view. FIG. 7 shows the seat belt retractor 10 in the mounted state. The gas generator 40 and the drive wheel 50 are fastened to different portions 150 and 160 of a C-shaped carrier 170 of the seat belt retractor 10 and are spatially separated from one another by the seat belt spindle 20.

Figure 8:
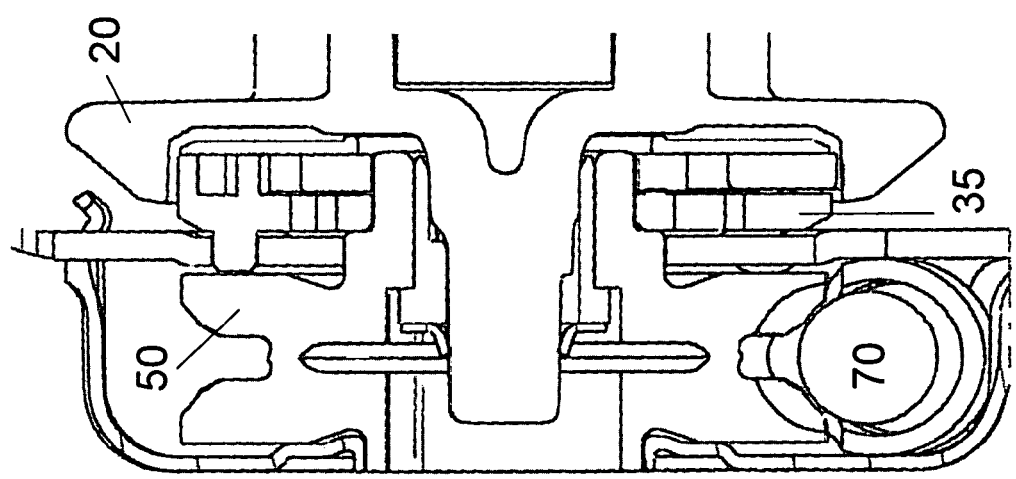
FIG. 8 is a cross-section view of the seat belt retractor of FIG. 1 showing the drive wheel according to an exemplary embodiment.

As shown in FIG. 8, the drive wheel 50 is coupled to the inertia coupling 35 and the inertia coupling 35 is, in turn, coupled to the seat belt spindle 20.

Figure 13:
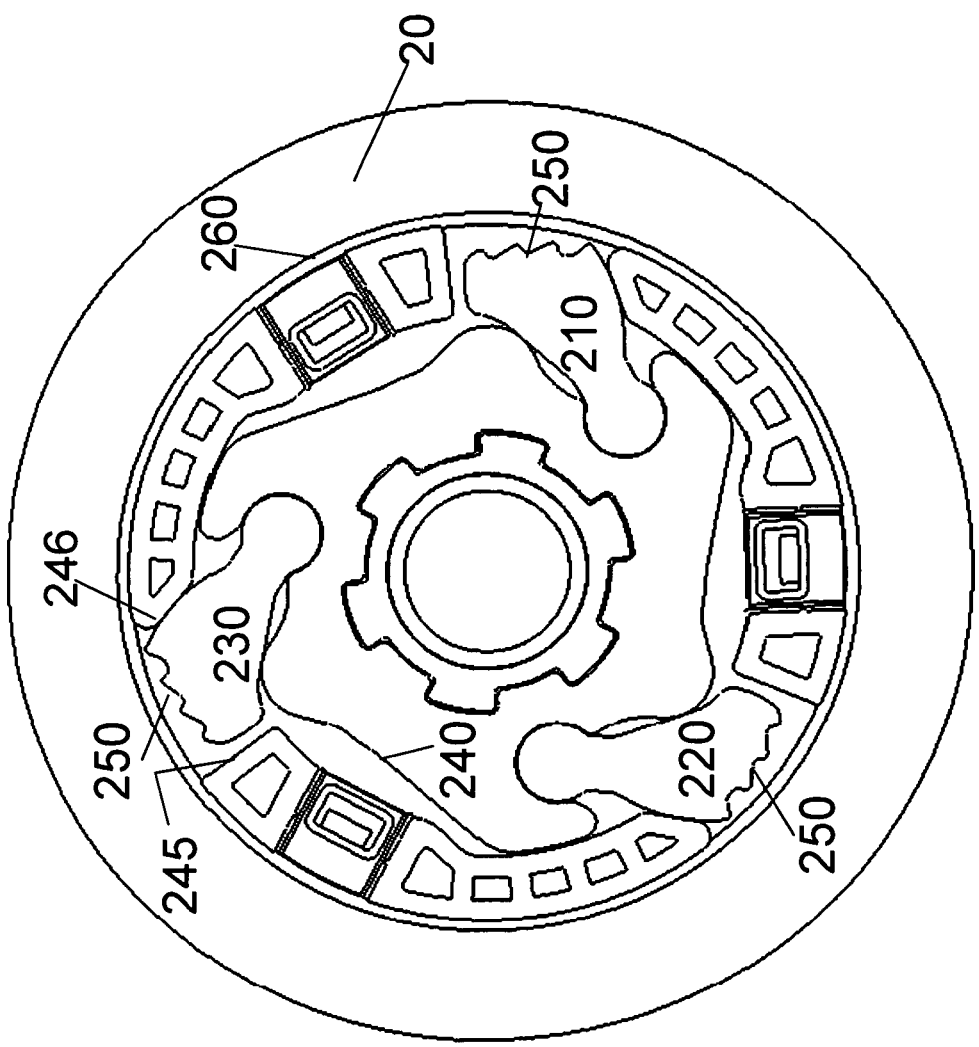
FIG. 13 is an end view of the inertia coupling of FIG. 11 with the coupling elements in an initial or disengaged state.
Figure 14:
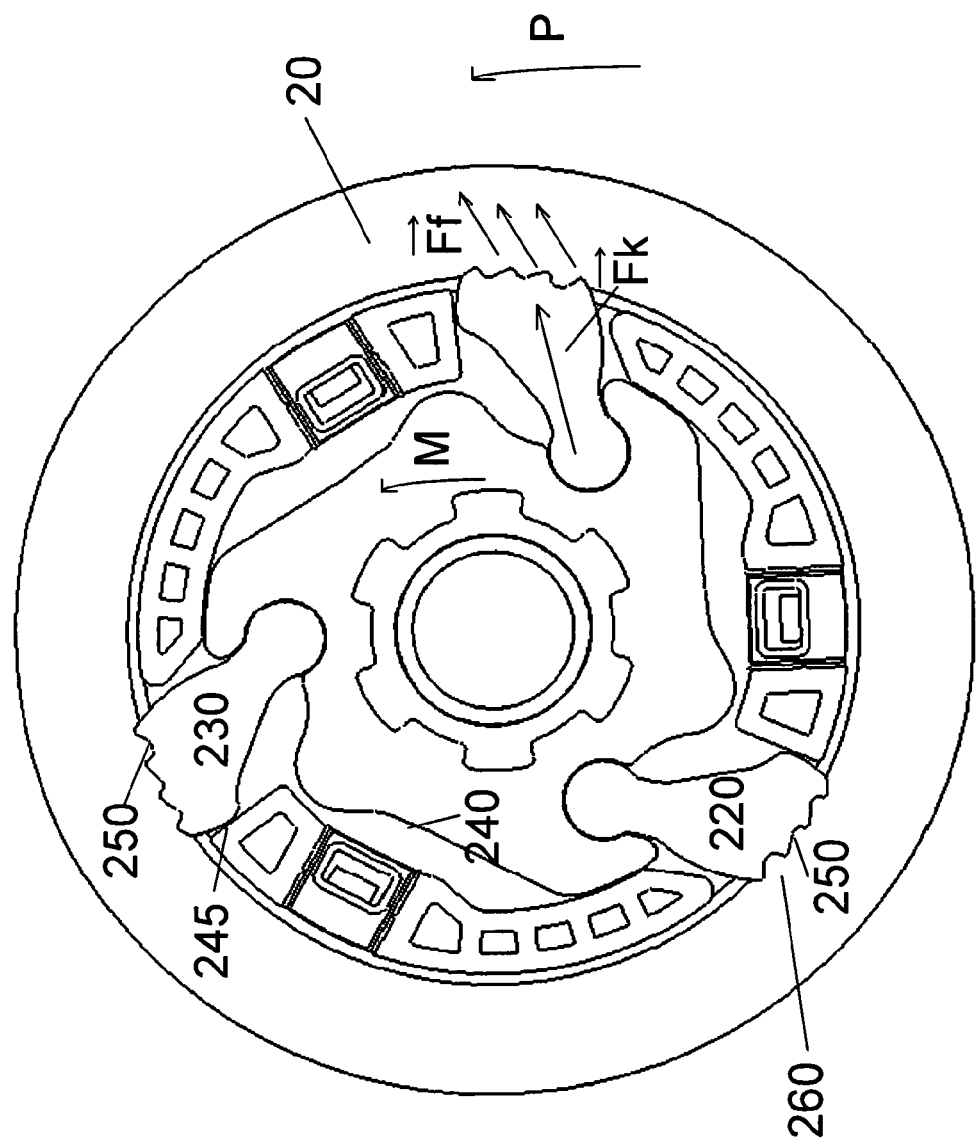
FIG. 14 is an end view of the inertia coupling of FIG. 11 with the coupling elements in an engaged state.

In FIGS. 11-14 the construction of the inertia coupling 35 is shown according to one exemplary embodiment. A coupling disk 200 is connected to the drive wheel 50 and driven thereby. The coupling disk 200 is formed by an inner ring 201, an outer ring 202, and resilient connecting elements 203. Three coupling elements 210, 220 and 230 which may be pivoted outward as well as a guide disk 240 are inserted into the coupling disk 200. In order to prevent the coupling elements 210, 220 and 230 from falling out of the guide disk 240, a cover plate 241, for example, may be latched to the coupling disk 200 to retain latching elements 242 and 243. FIG. 13 shows the relative position between the guide disk 240 and the outer ring 202 in the initial state.

The inner ring 201 and the guide disk 240 are connected to the drive wheel fixedly in terms of rotation.

If the drive wheel 50 is accelerated in the rotational direction P by the torque M of the tensioning drive 30, the resilient nature of the resilient connecting elements 203 allows the inner ring 201 to rotate relative to the outer ring 202. As the inner ring 201 rotates, stops 245 of the outer ring 202 pivot the coupling elements 220, 230 and 240 outward (see FIG. 14). The coupling elements 220, 230 and 240 with their grooved contact surfaces 250 are driven into the tubular inner wall 260 of the seat belt spindle 20. The tubular inner wall 260 is preferably smooth (e.g., formed without grooves or the like). The coupling is therefore engaged when the coupling elements are in contact with the inner wall 260 of the seat belt spindle 20. The force of the coupling elements is denoted by the force vector. The force transmission through the flat edges is denoted by the force vector.

If the tensioning force of the tensioning drive 30 is reduced, the relative rotation between the inner ring 201 and the outer ring 202 is again cancelled due to the resilient action of the resilient connecting elements 203. When the relative rotation is cancelled, the coupling elements 210, 220 and 230 are pivoted back by further stops 246 of the outer ring 202 into their initial position (see FIG. 13) before the tensioning process. As the coupling elements 210, 220, and 230 are pivoted back to their initial positions, they are once more separated from the seat belt spindle 20, so that the drive wheel 50 may not be rotated in the direction of extension of the seat belt. Such a reduction in the tensioning drive 30 may be a result of, for example, the gas generator 40 being used up and no longer providing sufficient drive pressure, or the tensioning process being completed and the seat belt spindle being rotated in the direction of extension of the seat belt.

The striking of the coupling elements against the inner wall 260 as well as the pivoting back of the coupling elements for the purpose of disengagement is made much simpler by the serrated shape of the contact surfaces 250, which have alternate steep and flat edges. As may be seen from FIG. 14, the serrated shape is selected such that the force transmission relative to the inner wall 260 is carried out through the flat edges. The flat edges, during the coupled state, are at a shallower angle relative to the inner wall 260 than the steep edges. It may be seen that the force vector of the flat edges, relative to the force vector, of the coupling elements is rotated by the alignment of the flat edges, and namely by an angle of between preferably 0 and 45 degrees, as well as in the direction of the torque M and/or in the belt tensioning rotational direction P.

Preferably, a seat belt force limiting mechanism is not provided in the force transmission path between the tensioning drive 30 and the seat belt spindle 20, i.e. neither between the drive wheel 50 and the inertia coupling 35 nor between the inertia coupling 35 and the seat belt spindle 20. The seat belt force is preferably limited only in the direction of extension of the seat belt and namely by a torsion bar, not shown further, which with one end is rigidly connected to the seat belt spindle 20 and with its other end to a locking mechanism of the seat belt retractor 10.

The seat belt retractor is preferably fixedly fastened to the vehicle frame (fixed to the frame). Preferably each tensioning drive, for example for lap belt tensioning and/or shoulder belt tensioning, respectively has its own gas generator.

Figure 15:
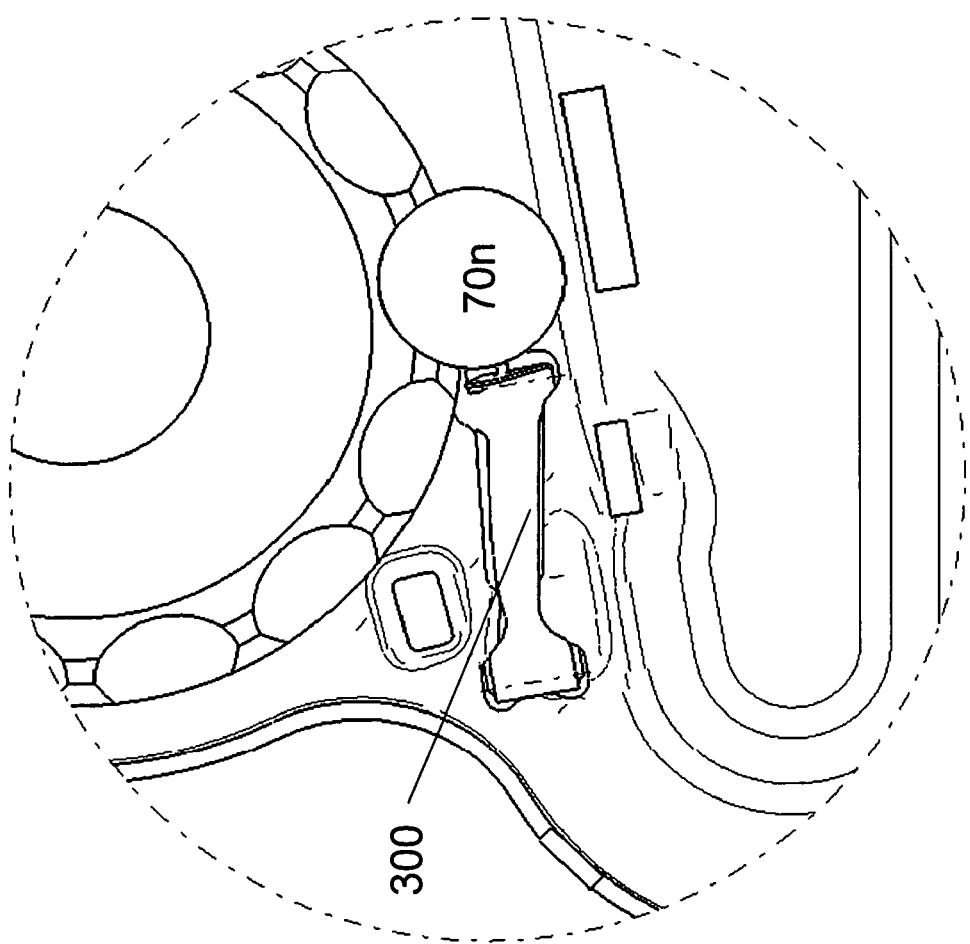
FIGS. 15 and 16 are end views of a retaining cap for a seat belt retractor from the drive wheel side according to another exemplary embodiment including a backstop element.
Figure 16:
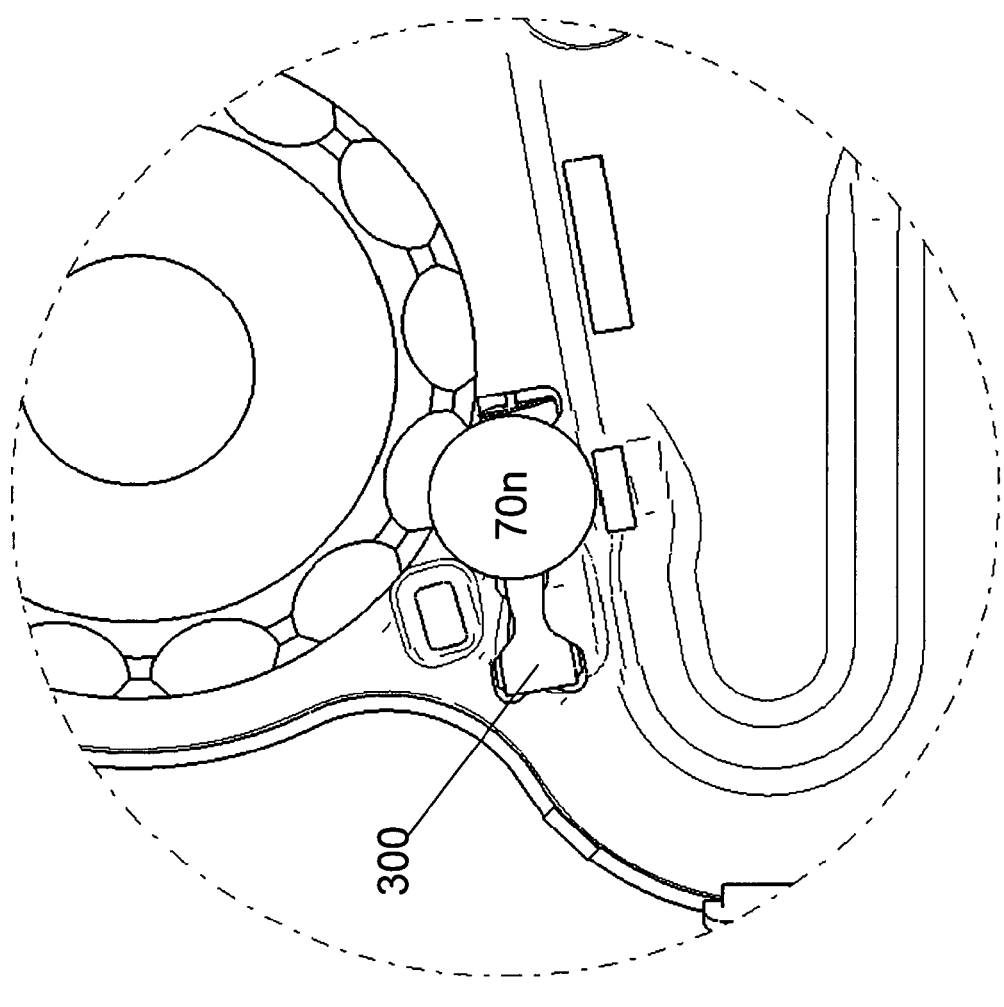

In FIGS. 15 and 16 a further exemplary embodiment for a seat belt retractor 10 is shown. In this exemplary embodiment, a backstop device in the form of a pivotable spring element 300 is present. The spring element is configured to allow thrust elements running past the drive wheel 50 to pass in only one direction, namely from the supply pipe 60 moving in the direction of the receptacle 110. Once past the spring element 300, the thrust elements are prevented from moving backwards, as shown in FIG. 16. The spring element 300 thus prevents, for example, the last thrust element $70n$ from being able to be moved back again toward the drive wheel 50 after completing the tensioning process.

The priority application, German Patent Application No. 10 2008 008 041.1, filed Feb. 5, 2008 including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application.

What is claimed is:

1. A seat belt retractor for a safety belt comprising:
    a seat belt spindle for winding up and unwinding the safety belt;
    a tensioning drive comprising:
        a gas generator,
        a drive wheel and a supply pipe which connects the gas generator and the drive wheel,
        a plurality of thrust members being present in the supply pipe which, after triggering the gas generator, are accelerated and indirectly or directly drive the drive wheel for winding up the safety belt,
        wherein between the drive wheel and the seat belt spindle an inertia coupling is arranged, the inertia coupling comprising coupling elements which, during an acceleration of the drive wheel, pivot outward and are directly or indirectly coupled to the seat belt spindle.

2. The seat belt retractor as claimed in claim 1, wherein the inertia coupling comprises a coupling disk connected to the drive wheel, which is formed by an inner ring, an outer ring and at least one resilient connecting element, the coupling elements and a guide disk of the inertia coupling being inserted into the coupling disk such that, with an acceleration of the drive wheel by the gas generator, the inner ring and the guide disk are rotated relative to the outer ring due to the resilient action of the resilient connecting element, so that stops of the outer ring pivot the coupling elements outward.

3. The seat belt retractor as claimed in claim 2, wherein the resilient connecting element is configured such that, when the tensioning force of the tensioning drive is reduced, the relative rotation between the inner ring and the outer ring is eliminated, so that the coupling elements are pivoted by further stops of the outer ring back into their initial position before the tensioning process.

4. The seat belt retractor as claimed in claim 1, wherein contact surfaces of the coupling elements are formed such that they remain engaged in the belt tensioning rotational direction under load and otherwise may be disengaged.

5. The seat belt retractor as claimed in claim 4, wherein the contact surfaces are grooved and the seat belt spindle comprises a tubular inner wall into which the grooved contact surfaces are forced when pivoted outward.

6. The seat belt retractor as claimed in claim 5, wherein the grooved contact surfaces of the coupling elements are serrated and have alternate steep and flat edges.

7. The seat belt retractor as claimed in claim 6, wherein the steep and flat edges are formed such that the force is transmitted to the seat belt spindle during the engaged state through the flat edges.

8. The seat belt retractor as claimed in claim 5, wherein the tubular inner wall is smooth before the initial contact with the coupling elements.

9. A seat belt retractor for a safety belt comprising:
a seat belt spindle for winding up and unwinding the safety belt;
a tensioning drive including a gas generator, a drive wheel and a supply pipe which connects the gas generator and the drive wheel, and a plurality of thrust members located in the supply pipe which are driven by gas supplied by the gas generator and drive the drive wheel in a direction to wind up the safety belt; and
a plurality of inertia coupling elements located between the drive wheel and the seat belt spindle, wherein the coupling elements are configured to pivot outward during acceleration of the drive wheel and are coupled to the seat belt spindle.

10. The seat belt retractor as claimed in claim 9, further comprising a guide disk and a coupling disk, wherein the coupling disk is formed by an inner ring, an outer ring and at least one resilient connecting element, wherein the outer ring includes stops and wherein the coupling disk is connected to the drive wheel, and wherein the coupling elements and the guide disk are inserted into the coupling disk; and wherein the retractor is configured so that when the drive wheel is driven by gas provided by the gas generator, the inner ring and the guide disk are rotated relative to the outer ring due to the resilient action of the resilient connecting element and the stops of the outer ring pivot the coupling elements outward.

11. The seat belt retractor as claimed in claim 7, wherein the flat edges, during the coupled state, are at a shallower angle relative to the inner wall of the seat belt spindle than the steep edges.

12. The seat belt retractor as claimed in claim 11, wherein the force vector of the flat edges $\vec{F}f$ relative to the force vector $\vec{F}k$ of the coupling elements is rotated by the alignment of the flat edges by an angle of between 0 and 45 degrees and in the direction of the torque M or in the belt tensioning rotational direction P.

* * * * *